US008852442B2

(12) United States Patent
Hayas et al.

(10) Patent No.: US 8,852,442 B2

(45) Date of Patent: Oct. 7, 2014

(54) SOLID CHEMICAL DISSOLVER AND METHODS

(75) Inventors: Matthew S. Hayas, Cincinnati, OH (US); George S. Grabow, Powell, OH (US); Donald A. Holt, Whitby (CA); Richard E. Haas, Milford, OH (US)

(73) Assignees: Delaware Capital Formation, Inc., Wilmington, DE (US); Ashland Licensing and Intellectual Property LLC, Dublin, OH (US)

(*) Notice: Subject to any disclaimer, the term of this patent is extended or adjusted under 35 U.S.C. 154(b) by 400 days.

(21) Appl. No.: 13/031,724

(22) Filed: Feb. 22, 2011 (Under 37 CFR 1.47)

(65) Prior Publication Data

US 2012/0111962 A1 May 10, 2012

Related U.S. Application Data

(60) Provisional application No. 61/339,702, filed on Mar. 8, 2010.

(51) Int. Cl.

| | |
|---|---|
| ***B01D 15/00*** | (2006.01) |
| ***C02F 1/76*** | (2006.01) |
| ***C02F 1/68*** | (2006.01) |
| ***B08B 7/00*** | (2006.01) |
| ***B23Q 7/00*** | (2006.01) |
| ***B65H 1/00*** | (2006.01) |
| ***B01F 1/00*** | (2006.01) |

(52) U.S. Cl.

CPC .................................... *B01F 1/0033* (2013.01)

USPC ........... 210/749; 210/679; 210/753; 210/764; 134/6; 221/174; 221/197

(58) Field of Classification Search

CPC ............. A61L 2/00; A61L 9/05; C02F 1/001; C02F 1/10; C02F 1/687; B01F 1/00

USPC ................. 422/261, 292, 300, 311, 902, 905; 210/679, 749, 753, 764; 134/6, 22.13, 134/22.16–22.17, 22.19; 221/30, 66–67, 221/69, 135, 154, 174, 186, 191, 197

See application file for complete search history.

(56) References Cited

U.S. PATENT DOCUMENTS

| | | | |
|---|---|---|---|
| 2,601,672 | A | 6/1952 | Gatchet |
| 3,107,156 | A | 10/1963 | Fredericks |

(Continued)

FOREIGN PATENT DOCUMENTS

| | | |
|---|---|---|
| EP | 0259038 | 3/1988 |
| GB | 2306301 | 5/1997 |

(Continued)

*Primary Examiner* — Monzer R Chorbaji

(74) *Attorney, Agent, or Firm* — Wood, Herron & Evans, LLP

(57) ABSTRACT

A solid chemical feed unit dissolver has an upper feed unit chamber with an inwardly tapering sealing surface at its lower end and against which a lowermost feed unit seals, retaining the upper chamber in a dry condition, preventing wetting and caking of solid chemical feed units behind the dissolving and sealed off face of the solid chemical feed unit. A solid chemical feed unit magazine is slotted to permit gentle feeding of a plurality of solid chemical feed units therein and a cover-defined sight slot permits guiding and visual observation of remaining solid chemical feed units in the magazine. The magazine preferably, but not necessarily, defines the tapering sealing surface. Distinctly shaped solid chemical feed units are disclosed. The dissolver can handle large solid chemical feed unit loads up to one hundred pounds or more and in a small footprint stable configuration. Methods are disclosed.

7 Claims, 4 Drawing Sheets

(56) References Cited

U.S. PATENT DOCUMENTS

| | | | | |
|---|---|---|---|---|
| 3,474,817 | A | 10/1969 | Bates | |
| 3,598,536 | A | 8/1971 | Spiegel | |
| 3,638,833 | A | 2/1972 | Lucas | |
| 3,710,817 | A | 1/1973 | Lorenzen | |
| 3,727,632 | A | 4/1973 | Pansini | |
| 3,734,291 | A | 5/1973 | Schondelmyer | |
| 3,846,078 | A | 11/1974 | Brett | |
| 3,850,344 | A | 11/1974 | Burge et al. | |
| 3,864,090 | A | 2/1975 | Richards | |
| 4,020,865 | A | 5/1977 | Moffat et al. | |
| 4,462,511 | A | 7/1984 | Fulmer et al. | |
| 4,571,327 | A | 2/1986 | Larson et al. | |
| 4,666,682 | A | 5/1987 | Mayer et al. | |
| 4,687,121 | A | 8/1987 | Copeland | |
| 4,690,305 | A | 9/1987 | Copeland | |
| 4,759,907 | A | 7/1988 | Kawolics et al. | |
| 4,790,981 | A | 12/1988 | Mayer et al. | |
| 4,917,868 | A * | 4/1990 | Alexander et al. | 422/119 |
| 5,007,559 | A | 4/1991 | Young | |
| 5,076,315 | A | 12/1991 | King | |
| 5,086,952 | A | 2/1992 | Kryk | |
| 5,089,127 | A | 2/1992 | Junker et al. | |
| 5,133,381 | A | 7/1992 | Wood et al. | |
| 5,229,084 | A | 7/1993 | Livingston et al. | |
| 5,240,326 | A | 8/1993 | Evanson | |
| 5,253,937 | A | 10/1993 | Scheimann et al. | |
| 5,384,102 | A | 1/1995 | Ferguson et al. | |
| 5,417,939 | A * | 5/1995 | Bunschoten et al. | 422/264 |
| 5,427,748 | A | 6/1995 | Wiedrich et al. | |
| 5,468,066 | A | 11/1995 | Hammonds | |
| 5,577,527 | A | 11/1996 | Jacobs et al. | |
| 5,759,501 | A | 6/1998 | Livingston et al. | |
| 5,810,043 | A | 9/1998 | Grenier | |
| 5,846,499 | A | 12/1998 | Laughlin et al. | |
| 5,928,608 | A | 7/1999 | Levesque et al. | |
| 6,007,788 | A | 12/1999 | Bellon et al. | |
| 6,138,703 | A | 10/2000 | Ferguson et al. | |
| 6,213,353 | B1 | 4/2001 | Haul et al. | |
| 6,240,953 | B1 | 6/2001 | Laughlin et al. | |
| 6,298,871 | B1 | 10/2001 | Pickens et al. | |
| 6,337,024 | B1 | 1/2002 | Hammonds | |
| 6,413,416 | B1 | 7/2002 | Buchan | |
| 6,451,271 | B1 | 9/2002 | Hammonds | |
| 6,497,822 | B2 | 12/2002 | Blanchette et al. | |
| 6,517,727 | B2 | 2/2003 | Pickens et al. | |
| 6,531,056 | B2 | 3/2003 | Hammonds | |
| 6,544,414 | B2 | 4/2003 | Hammonds | |
| 6,915,811 | B2 | 7/2005 | Blanchette et al. | |
| 7,048,898 | B1 | 5/2006 | Moriyama et al. | |
| 7,081,232 | B1 | 7/2006 | Dooley, Jr. et al. | |
| 7,083,717 | B1 | 8/2006 | Hustelll et al. | |
| 7,143,778 | B2 | 12/2006 | Blanchette et al. | |
| 7,201,290 | B2 | 4/2007 | Mehus et al. | |
| 7,229,599 | B2 | 6/2007 | Horacek et al. | |
| 7,410,623 | B2 | 8/2008 | Mehus et al. | |
| 2005/0023290 | A1 | 2/2005 | Kon et al. | |
| 2005/0244315 | A1 | 11/2005 | Greaves et al. | |

FOREIGN PATENT DOCUMENTS

| | | |
|---|---|---|
| JP | 5168678 | 7/1993 |
| JP | 9173271 | 7/1997 |
| JP | 9276202 | 10/1997 |

* cited by examiner

SOLID CHEMICAL DISSOLVER AND METHODS

PRIORITY CLAIM

Benefit of the filing date, Mar. 8, 2010 of provisional patent application Ser. No. 61/339,702 entitled SOLID CHEMICAL DISSOLVER AND METHODS is claimed, and that application, in its entirety, is expressly incorporated herein as if fully set out herein.

FIELD OF THE INVENTION

This invention relates to apparatus and methods for dissolving chemicals from a solid form to produce a chemical solution. More particularly, this invention relates to chemical dissolvers and methods for producing chemical solutions for water or process treatment from solid form chemicals.

BACKGROUND OF THE INVENTION

It is known to provide concentrated chemical solution for introduction into liquid systems or processes for a variety of purposes. For example, chemical concentrates, including mixtures of different chemistries, are diluted to provide solutions for water treatment and prevention of scale and deposit accretion and buildup in tanks, boilers and cooling towers and in both open and closed water systems, for industrial cleaning, for detergent production in dishwashing systems and washing machines, for other cleaning and sanitizing purposes, and for continual and periodic cleaning and maintenance functions in a variety of applications.

Typically, a “dissolver” for dissolving or diluting a chemical is used to receive a chemical concentrate, dissolve or dilute it, and introduce the resulting solution to a system for treatment.

Specific disclosures of such prior apparatus and processes are found, for example, in U.S. Pat. Nos. 2,371,720; 3,383,178; 3,595,438; 4,858,449; 4,964,185; 5,137,694; 6,441,073; 6,418,958; 6,820,661; in United States Patent Publication Nos. US2007/0269894 and US2010/0025338. Each of these is expressly incorporated herein by reference and is a part hereof as if fully set out herein. Copies of these are attached and are a part hereof.

Moreover, it will be appreciated that systems for producing a concentrated chemical solution and for delivering that solution to a system for use are typically designed for specific applications due to the parameters of the system to be treated; all the way from washing machines on one hand to closed loop water tower and processes or building cooling systems on the other. Volumes, pressures, temperatures, water chemistries, chemical solutions required and many other parameters require significantly different dissolving and delivery systems.

Another consideration in this field is the state or form of the concentrated chemical used to form the treatment solution. Concentrated chemicals can be provided in either a concentrated liquid form or in a “solid” form. The term “solid” is herein used to differentiate or distinguish from other forms of chemical such as granules, flakes, beads, free flowing aggregates, particulates, powder and liquid. The terms “solid” and “solid chemical feed unit” as used herein are thus intended to refer to a monolithic mass in a freestanding, structural shape which may be formed by any suitable process including but not limited to compression, casting, molding and other processes. When dissolving a chemical in solid form, it is typical to spray a pattern of water onto the face of the solid chemical.

Comparisons of liquid to solid concentrated chemicals are set out in United States Patent Pub No. US2010/0025338, incorporated herein by reference.

When considering use of chemicals in solid form such as solid chemical feed units, particularly in the treatment of larger water systems such as heating and cooling systems, relatively larger amounts of concentrated chemical are required as compared to smaller volume systems. Regardless of the size of the solid chemical feed unit system, the feeding and dissolving process must be consistent so the chemical solution produced by the dissolving process is accurate and consistent.

Potentially interfering with these considerations is the nature of the interface of the solid chemical feed unit being dissolved by a water spray. While it is important to consistently dissolve chemical from the solid feed unit at a forward surface of that unit, it is also desirable to maintain chemical behind that surface as dry as possible to prevent such wetting and caking as would prevent consistent presentation of chemical at a location where the water spray most effectively and uniformly dissolves the chemical. Said in another way, if chemical in a solid feed unit behind the interface of the forward surface and the water spray becomes wet or cakes, feeding or movement of the solid chemical feed unit toward the spray interface can be adversely affected, as well as the surface of the solid chemical receiving the spray pattern. This can result in stoppages, in inconsistent solution production and in production of widely varying solution content adversely affecting the efficiency and viability of the treatment desired.

In another aspect of solid chemical feed unit dissolving, it is desirable that operator time and attendance at the dissolver be reduced, even while the dissolver must be capable of producing large amounts of chemical solution for large volume applications. This requires operable disposition of significant numbers of solid chemical feed units in the dissolver. While a plurality of such solid chemical feed units might be stacked, such as a small plurality of such solid chemical feed units in a much lower capacity dissolver (like four solid chemical feed units provided in a gallon-sized bucket), it is desired to provide apparatus and processes for handling much larger amounts of solid chemical feed units for much larger applications without the frequent operator attention required for gallon-sized solid chemical feed unit fills in such larger units.

It is also desirable to provide solid chemical feed unit dissolvers facilitating use of multiple solid chemical feed units without damage from dropping solid chemical feed units one onto another, and without feeding or consistency issues arising from wetting or caking. For example, in some applications, it may be desirable to accommodate fills of about fifty to two hundred pounds or so of total solid chemical feed unit weight where large volume systems are to be serviced. And it is desired to do so within a small dissolver footprint, but in a stable application.

Finally, it is desirable to provide the capability of observing the feed units in the dissolver as an indication of current status and the need to replenish the feed units for consistent treatment. Typical small capacity dissolvers do not provide such observation capacity.

SUMMARY OF THE INVENTION

To these ends, the invention contemplates an improved solid chemical feed unit dissolver and solid chemical feed units combined to facilitate multiple solid chemical feed unit filling, provide high capacity dissolver operation, prevent undesirable feed unit caking and wetting, provide visual feed unit status and provide consistent sustainable chemical dissolving and solution for system treatment, all in a small footprint and from a stable dissolver.

A preferred embodiment of the invention contemplates a magazine sized and shaped to handle, preferably, a plurality of solid chemical feed units, in one form comprising disc-shaped feed units stacked vertically in the upper chamber of the magazine. A tapered sealing surface, smaller in diameter than the lower face of a disc-shaped feed unit, is preferably an integral part of the lower end of the magazine. The periphery of the lowermost feed unit rests on this surface, sealing the upstream chamber of the magazine from a spray directed upwardly through a screen and against the lower face of the lowermost feed unit to dissolve the solid chemical into a solution flowing downwardly and collected in a reservoir.

As the lower face of the feed unit is dissolved, the feed init progressively feeds, downwardly toward the plane defined by the lower dissolving face thereof and its seal contact with the tapered surface.

Thus, as the solid chemical is dissolved by the spray at this lower face, that feed unit, and those above, move progressively downwardly, yet the upper chamber above the plane where the dissolving action occurs is sealed by the advancing chemical feed unit so the upper chamber and feed units therein are retained in a relatively drier area and do not mat, clog or otherwise adversely affect the accurate and consistent dissolving of the chemical at the lower face of the lowermost feed unit.

The magazine is provided with access slots to facilitate gentle handling of the feed units which are loaded into the magazine, and with visual access therein to permit an operator to determine the load status of the magazine.

These and other advantages and modifications of the invention will become readily apparent from the following written description and from the drawings in which:

DETAILED DESCRIPTION OF THE INVENTION

Figure 1:
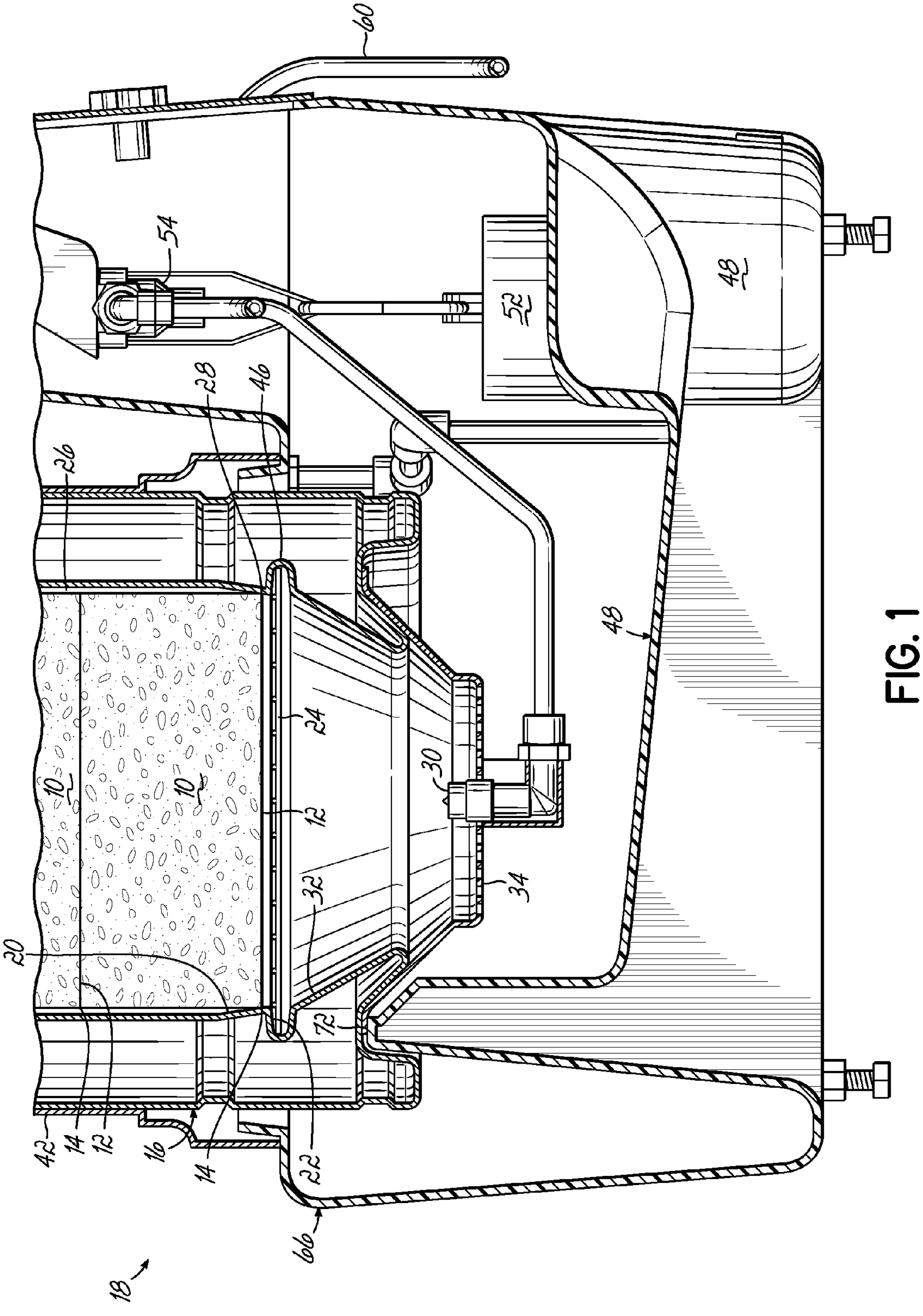
FIG. 1 is an illustrative cross-sectional view showing a dissolver with feed unit magazine mounted thereon and showing the lower end of the magazine where the inwardly tapering surface forms a seal with the lower edge of the lowermost solid chemical feed unit.
Figure 2:
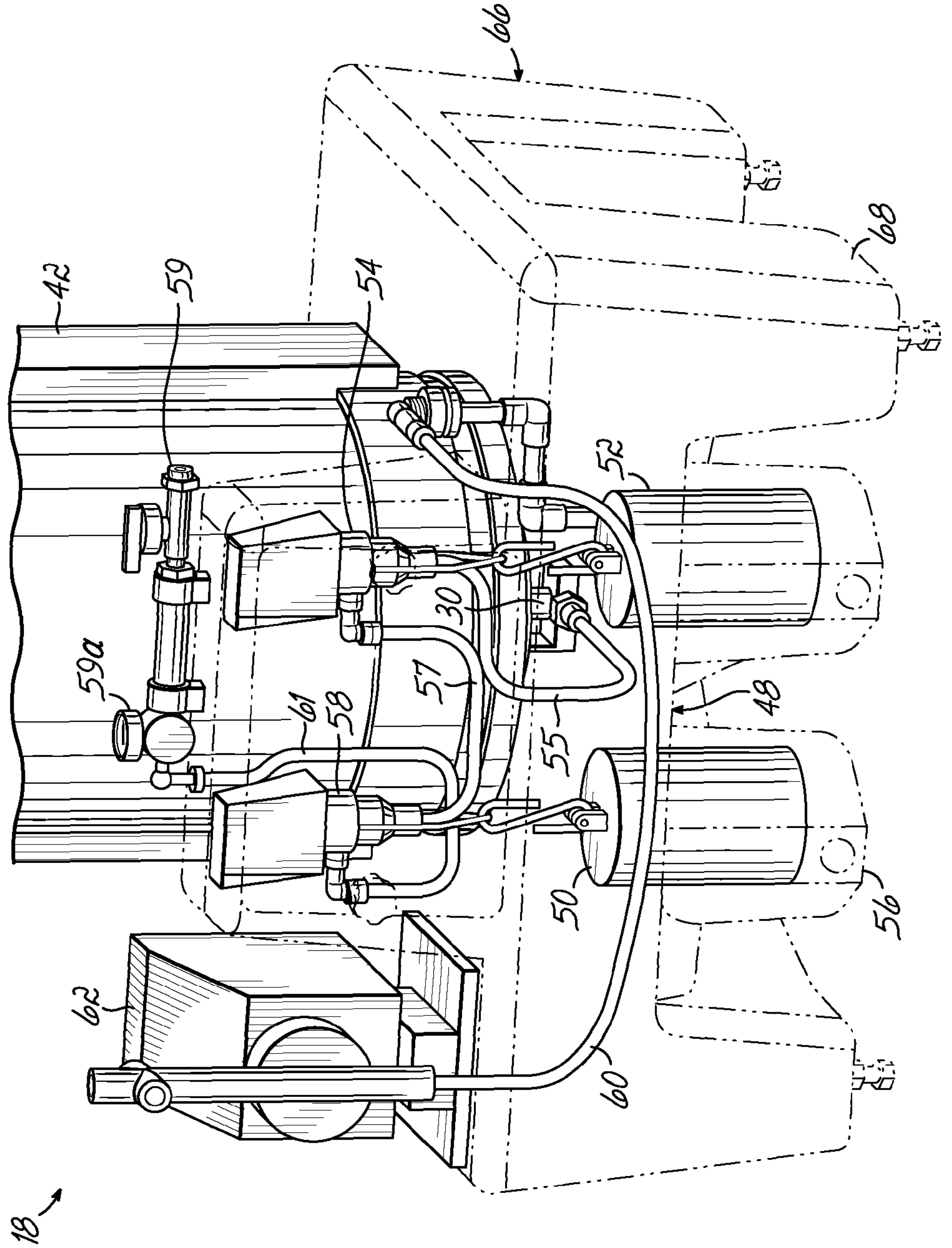
FIG. 2 is an isometric view of a dissolver and magazine as in FIG. 1 wherein selected components are shown in transparent format for clarity and explanation.
Figure 4:
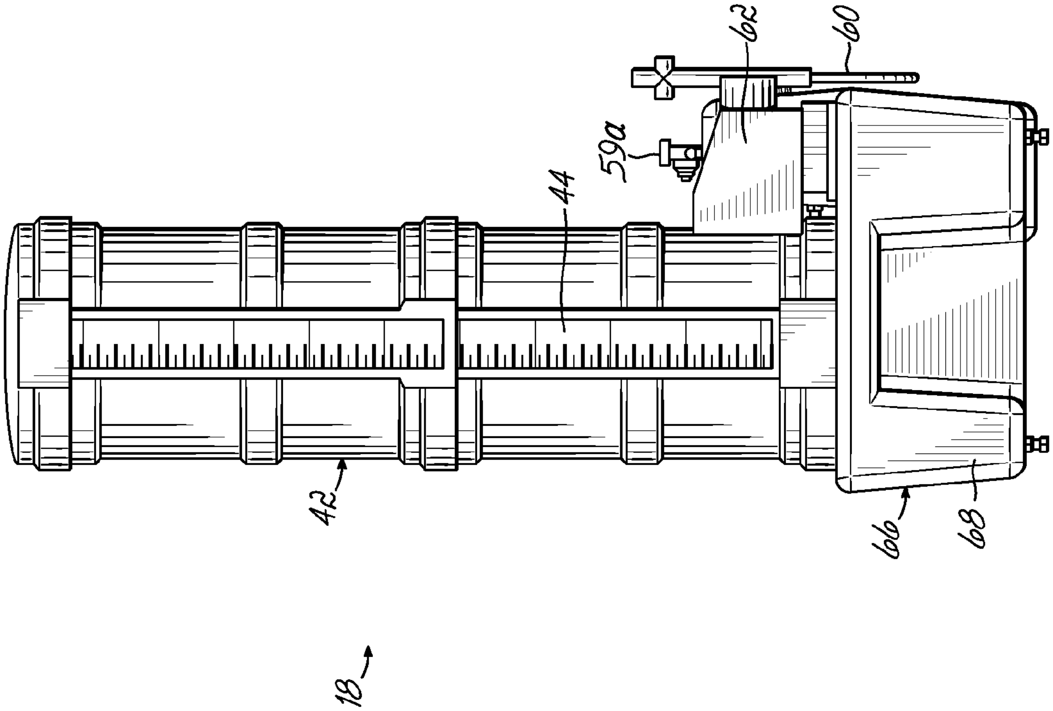
FIG. 4 is an elevational view of the dissolver and covered magazine of FIG. 1, with solid chemical feed units visible through a magazine slot and cover sight window.

Preferably as used herein, the term "dissolver" includes a solid chemical feed unit dissolving apparatus and an associated operatively mounted solid chemical feed unit magazine or guide for holding and introducing successive solid chemical feed units sequentially to a dissolving location or station in the dissolver.

As illustrated in the drawings, preferred solid chemical feed units useful in the invention are in the form of a cylinder or disc 10 having a forward face 12 defined by a circular edge 14. Disc 10 has predetermined height and is preferably, but not necessarily, from six to nine inches in diameter, about one to six inches in height and preferably three inches high. Preferably, the forward face 12 is about 20 inches to 110 square inches in surface area. Preferably, a single solid chemical feed unit weighs in the range of eight to ten pounds. These parameters are illustrative only; other sizes, areas and weights could be used.

One embodiment of the invention comprises a unique solid chemical feed unit magazine 16 in operable cooperation as part of a dissolver apparatus 18 wherein the magazine 16 has a slight inwardly tapered surface or constriction 20 at a lower magazine end 22, just upstream or above a first screen 24. As noted, a solid chemical feed unit 10 is preferably, but not exclusively, cylindrical in shape, with a lower circular face surface 12 defined by an edge 14 engaging the tapered surface 20 of the magazine 16 and sealing off upper chamber areas 26 of the magazine above the seal 28 produced by the engagement of the lower feed unit edge 14 with the tapered surface 20.

Alternately, the tapered surface 20 may be operatively disposed in the dissolver 18 at a seal location downstream of the magazine 16, while providing a seal against moisture intrusion into the magazine 16 and above the face surface 12 of a feed unit 10 being dissolved.

The upper first screen 24 is disposed in the magazine 16 proximate the so-formed seal 28 and just below the lower face 12 of the forward or lowermost solid chemical feed unit 10. The first screen 24 is of any suitable construction and preferably of stainless steel wire in No. 2 mesh, i.e. one-half inch mesh. An upwardly directed nozzle 30 is disposed below the screen 24. The nozzle 30 sprays a consistent and preferably uniform water pattern up through the screen onto the lower circular face 12 of the solid chemical feed unit 10, which is thus dissolved. As the solid chemical feed unit 10 is so dissolved, dissolved chemical drops toward and through the first screen 24 onto a collection funnel 32 or tapered collecting surface thereof, yet all the while its advancing lower face 12 at its circular edge 14 seals against the tapered surface 20, preventing wetting and caking of the solid chemical feed unit or units 10 above the dissolving face 12. The solid chemical feed unit 10 and successive solid chemical feed units descend in the magazine 16 toward the tapered surface 20 and seal as the nozzle 30 continues to spray, maintaining both the seal 28 and the presentation of a feed unit surface for dissolving by the nozzle 30 spray. The seal 28 is maintained whether the nozzle spray 30 produces continuously or intermittently.

As the face 12 of the solid chemical feed unit 10 is sprayed and dissolved by the water, diluted chemical solution falls past the nozzle onto a secondary, lower screen 34 at the bottom of funnel 32 for catching any lumps or pieces of undissolved chemicals falling through the first screen 24 and which are collected and optionally presented to waste. The lower screen 34 is preferably an integral part or floor of the collection funnel 32 with a plurality of one-quarter inch holes therein, whereby pieces of undissolved chemical are captured in the floor and can be further dissolved.

Thus, it will be appreciated that the magazine 16 defines an upper feed unit chamber 26 for accepting a plurality of solid chemical feed units 10 in tandem and for feeding each unit 10 serially toward the tapering surface 20, forming a seal 28 with the edge 14 of the lowermost feed unit.

Figure 3:
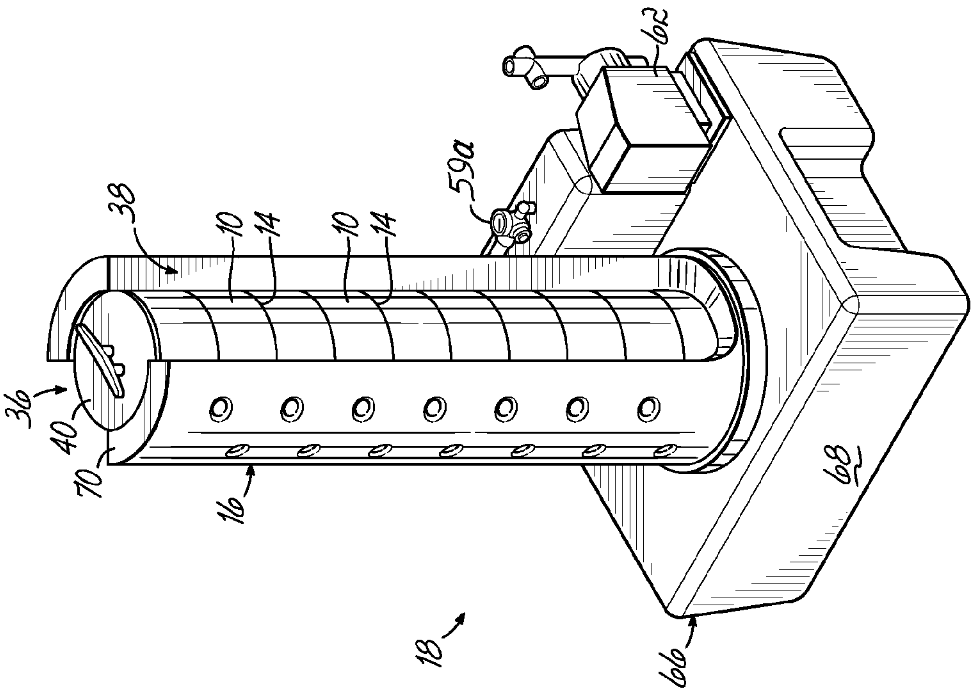
FIG. 3 is a perspective view of a dissolver and magazine of FIG. 1, illustrating an uncovered magazine, filled with solid chemical feed units.
Figure 6:
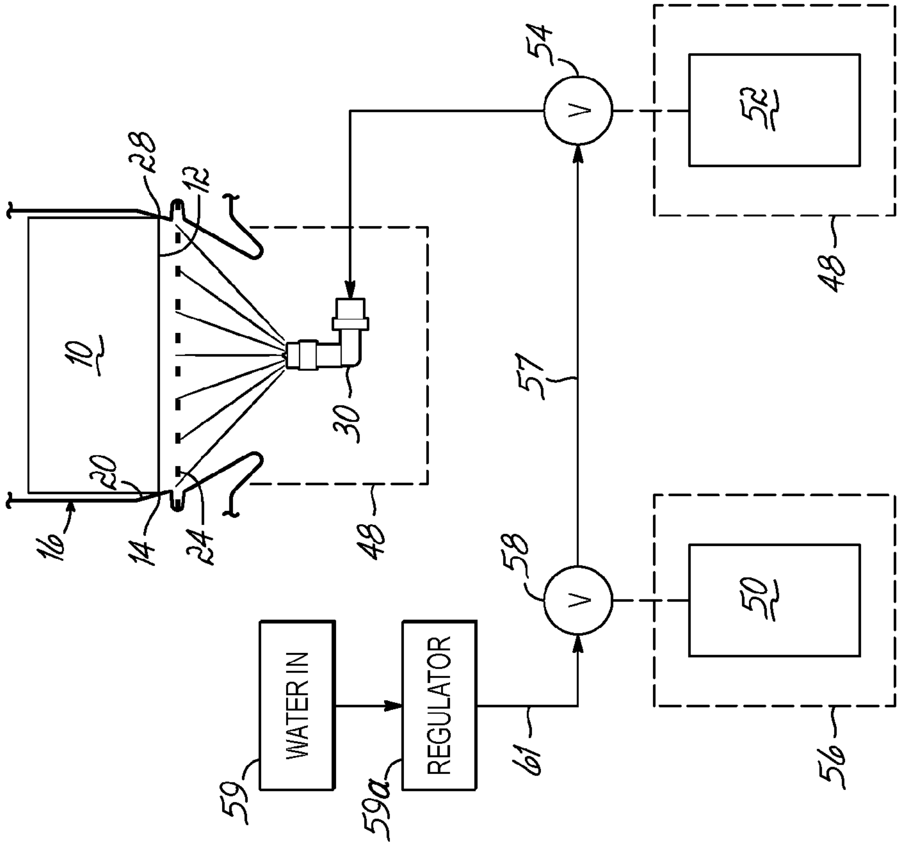
FIG. 6 is a schematic flowchart showing flow of regulated water from the regulator to the serially connected second and first valves to the spray nozzle, and also illustrating diagrammatically the overflow tank and the solution reservoir (depicted in two places), as well as the solid chemical feed unit, tapered sealing surface and screen.
Figure 5:
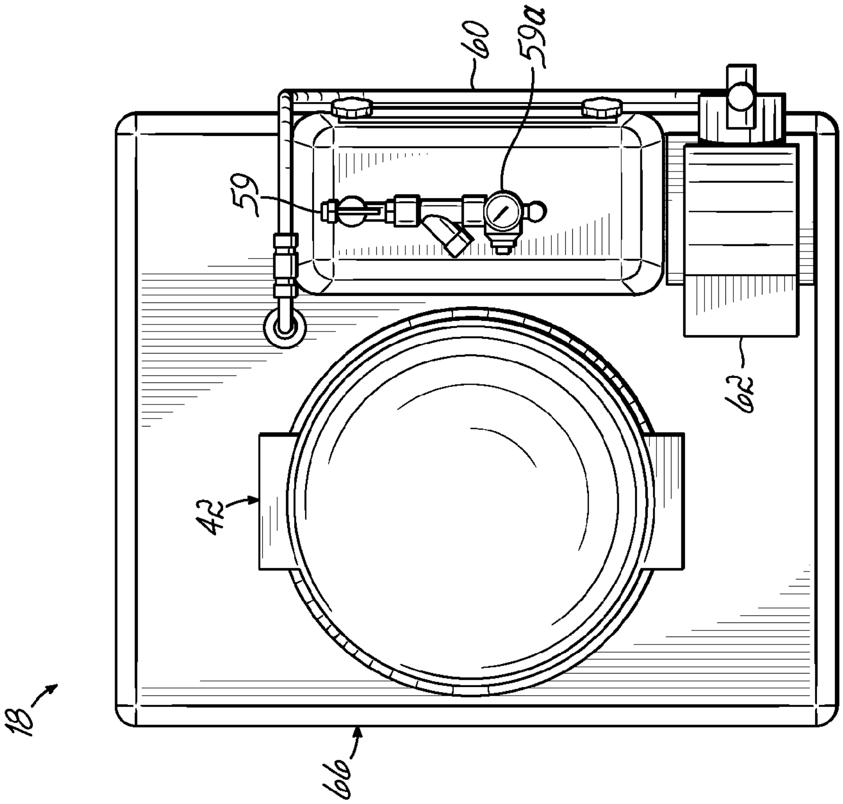
FIG. 5 is a top plan view of a dissolver and magazine.

In another aspect of the invention, the magazine 16 defines two elongated slots 36, 38 (FIG. 3) on opposite sides thereof. Cylindrically-shaped solid chemical feed units 10 are manually lowered within the magazine 16 and from the top by physical support facilitated by the slots 36, 38, until the feed units 10 are settled on the seal 28 or on the proceeding feed unit 10. A guide cover 40 is placed on the last or uppermost feed unit 10 and follows the units 10 downwardly as they are successively dissolved. If the last unit in the magazine is fully dissolved, the guide cover 40 deflects any spray from the nozzle 30 from entering the magazine chamber 26 through the screen; it too sealing or contacting the tapering seal surface 20.

A magazine cover 42 may be disposed over the magazine 16. This cover 42 is preferably provided with an elongated sight window 44 with measuring scale aligned with one of said slots 36, 38 and through which the feed units 10 therein can be viewed and measured as an indication of solid chemical feed unit status and any need to load more solid chemical feed units 10. It is thus easy for an operator to assure continued operation of a treatment process by visual observation.

Just below the tapered surface 20 of the magazine, 16 a circular groove 46 in a surface of either the magazine 16 or other dissolver parts accommodates, supports or positions the periphery of the circular screen 24 noted above. The further tapered surface below the screen in the form of a collection funnel 32 funnels chemical solution downwardly to a collection area or reservoir 48 within the dissolver 18 wherein one or more floats 50, 52 are disposed to control water flow through line 55 to the nozzle 30 based on the fill condition of a solution reservoir 48. Primary chemical solution is directed to a solution reservoir 48 in which a float 52 activates a first valve 54 when the reservoir 48 is filled, shutting off water to the nozzle 30. If that reservoir 48 has overflowed into an overflow tank 56 despite the condition of the first valve 54 and its float 52, a second float 50 in the overflow tank 56 shuts a second valve 58, serially connected to the first valve 54 (through conduit 57) from upstream thereof, as a failsafe to shut off water from water inlet 59, pressure regulator 59*a* and conduit 61, to the first valve 54, line 55 and nozzle 30 and to stop nozzle 30 spray onto a feed unit 10. The supply of water to the serially-connected valves 54, 58 and nozzle 30 is pressure regulated to produce a consistent spray from the nozzle 30.

A pick-up tube 60 transfers chemical solution to an outlet pump 62 from the solution reservoir 58 for transport to a water system or other process stream.

Also, it will be appreciated that the invention is useful in multiple applications where available water pressures might vary significantly from one application to the other and in the approximate range of 25 to 100 psi and more likely 25-40 psi. According to the invention, the water supply nozzle 30 is regulated to about 25 psi (regulator 59*a*) and at this pressure, the nozzle 30 delivers water diluent in a spray pattern to the face of the solid chemical feed unit at a rate of about 0.5 gallons per minute to produce a chemical solution at about 0.5% to about 1.0% concentration.

Preferably, and to provide consistent chemical solution by presenting a continually uniform solid chemical feed unit face 12 and surface area defined at the forward face, each solid chemical feed unit 10 has a shape such that surface area of the solid chemical feed unit is positioned at a constant distance from the nozzle 30 at the first screen 24. Provision of a uniform water pattern, emanating from a nozzle 30 at a uniform distance from the face of the operative solid chemical feed unit, and at a uniform low pressure facilitates a consistent, accurate and constant solution and treatment process.

It will also be appreciated that the dissolver 18 provides a very high capacity solid chemical feed unit dissolving process but in a relatively small footprint. Essentially, the dissolver unit 18 at its lower end is about 24 inches wide by 28 inches long and about one foot tall, or alternately, it could be other sizes, such as 18 inches wide and about 22 inches long. The housing 66 forms preferably integral both reservoir 48 and overflow tanks 56 of about one quart capacity each, and an additional containment tank 68 beyond these two tanks to accommodate an unexpected spill or malfunction. The magazine has an upper loading end 70, about five feet from the bottom of the dissolver housing 66, and is about thirteen inches in diameter, with cover 42. The lower end of the magazine is secured to the dissolver housing 66 so it does not separate if the entire apparatus is tipped. Since the lower end of the magazine 16 is disposed within the housing 66, the center of gravity of the unity is relatively low and the dissolver is stable. For example, magazine 16 may be supported by an integral seat 72 of housing 66, and other portions of the housing 66 and may be otherwise suitably fastened to the housing.

It will thus be appreciated that the dissolver 18 is partially defined by a housing 66 or body which usefully comprises a molded housing 66 of any suitable material defining a solution reservoir 48, an overflow tank 56, a containment tank 68, a seat 72 for a magazine and such conduits, valves 54, 58 nozzle 30 and the like to perform the dissolving function. The reservoir 48 and overflow tank 56 may be an integrally formed portion of the dissolver body 66. As will be appreciated, the magazine 16 is removably but securely seated on the dissolver 18 as shown in the drawings. The tapered sealing surface 20 and screen 24 could be formed in the dissolver 18, below a magazine 16, if desired, as opposed to the preferred disposition as part of the magazine 16.

In an alternate embodiment, the solid chemical feed units 10 may be provided in other shapes than cylinders or discs. For example, a disc shape with a sector removed, a unit in the form of a multiple-sided shape of curved or straight lines, or a variety of other feed unit shapes could be used. Consequently, the tapering seal surface 20 may also be provided in similar and cooperating configurations to produce the seal 28 with the solid chemical feed unit 10 discussed herein and to prevent moisture transport or migration beyond a spray-receiving dissolving face 12 of such a feed unit.

The parameters of a uniform pattern consistent with the shape of the solid chemical feed unit face 12, uniform distance from spray nozzle 30 to that face, and uniform water pressure are all preferably provided and retained.

These embodiments facilitate treatment of a variety of process streams from solid chemical feed units.

From the foregoing, it will be appreciated that the invention provides a solid form chemical dissolver having a unique high capacity magazine and solid chemical feed units and which prevents dissolving process obstruction from wetting or caking of subsequent solid chemical feed units as well as provides consistent chemical dissolving, either continuously or intermittently, and resulting accurate solutions for system treatments. These benefits are attained in addition to such improved apparatus and methods as a result from a dissolver of small footprint, providing high capacity in a yet stable unit with accurate solution production and decreased operator time and attention.

A variety of solid chemicals provided in solid chemical feed units can be used with this invention. These include, by way of example only, and without limitation: phosphonate; tolytriazole; molybdate; polymers; caustics; sulfite and nitrate.

These and other advantages and modifications will become readily apparent to those of ordinary skill in the art and without departing from the scope of this invention and applicant intends to be bound only by the claims appended hereto.

What is claimed is:

1. A method of dissolving a solid chemical feed unit in a solid chemical feed unit dissolver having a solid chemical feed unit chamber including an inwardly tapered surface proximate one end thereof, including the steps of:

introducing a solid chemical feed unit in said chamber;

creating a seal at a seal location between said solid chemical feed unit and said tapered surface when an edge of said solid chemical feed unit engages said surface; and spraying a diluent onto a face of said solid chemical feed unit defined by said edge, and including the further steps of advancing said solid chemical feed unit toward said seal location while spraying said face and dissolving said solid chemical feed unit, and while retaining a seal between said solid chemical feed unit and said tapered surface.

2. A process as in claim 1 further comprising the steps of:

forming a chemical solution from chemical at said face; and feeding said chemical solution to a process stream.

3. A method for loading a solid chemical feed unit magazine in a dissolver with a plurality of solid chemical feed units including the steps of:

introducing a solid chemical feed unit to a mouth of a feed unit magazine;

lowering successive ones of said solid chemical feed units into said magazine;

manipulating said solid chemical feed units as they are loaded into an upper end of said magazine by engaging said solid chemical units from outside said magazine and through elongated slots disposed through said magazine, and including the step of sealing a lowermost solid chemical feed unit on an inwardly tapered surface of said magazine when said lowermost solid chemical feed unit is lowered in said magazine.

4. A process for producing a chemical solution formed from a solid chemical to a process stream and comprising the steps of:

feeding a solid chemical feed unit having a forward face toward a dissolving position;

spraying a diluent pattern onto said face to dissolve solid chemical at said face into a chemical solution;

sealing said solid chemical feed unit at an edge thereof around said face against a surface, and preventing said pattern of diluent from contact with said solid chemical feed unit behind said face by engaging said edge of solid chemical around said face with said surface; and transporting said chemical solution to a process stream.

5. Process as in claim 4 wherein said sealing step includes engaging said feed unit face edge on an inwardly tapering portion of said surface.

6. A method as in claim 4 including feeding at least one solid chemical feed unit toward said seal location as a solid chemical feed unit face is dissolved.

7. A method as in claim 4 wherein said spraying is one of continuous or intermittent.

* * * * *